June 25, 1957 E. M. VOGLER 2,797,125

WHEELBARROW BED ADAPTOR

Filed Nov. 1, 1955

INVENTOR.

ELLIS M. VOGLER 2,797,125
Patented June 25, 1957

2,797,125

WHEELBARROW BED ADAPTOR

Ellis M. Vogler, Lubbock, Tex.

Application November 1, 1955, Serial No. 544,273

1 Claim. (Cl. 296—35)

This invention relates to wheelbarrows and more particularly to a wheelbarrow bed adaptor.

It is an object of the present invention to provide a wheelbarrow bed adaptor which is particularly useful when loading a wheelbarrow onto a high truck and which permits the removal of the bed so that the wheelbarrow can be loaded in two parts.

It is another object of the present invention to provide a wheelbarrow bed adaptor of the above type wherein several type beds may be mounted on a unitary frame, making it possible to have the correct type bed for the job and to reduce the costs as compared with the cost of two separate wheelbarrows.

It is still another object of the present invention to provide a wheelbarrow bed adaptor of the above type wherein any type of wheelbarrow bed may be mounted onto the wheelbarrow frame and which permits ease and speed in converting from one type bed to another.

For other objects and for a better understanding of the invention, reference may be had to the following detailed description taken in connection with the accompanying drawing, in which.

Figure 1:
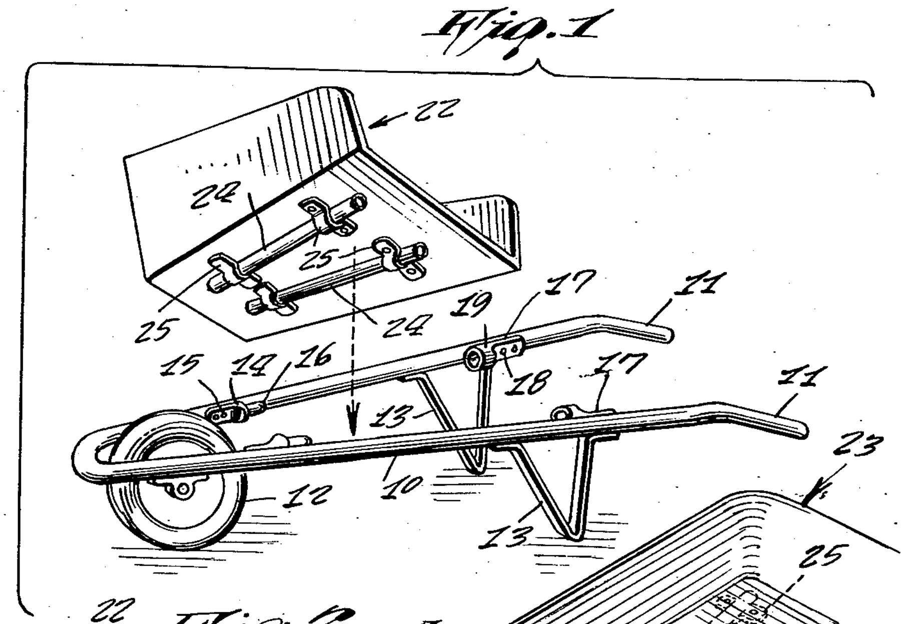
Figure 1 is an exploded perspective view of a preferred embodiment of the present invention showing both a wood flat bed and a metal bed adapted to be used with a single wheelbarrow frame.
Figure 2:
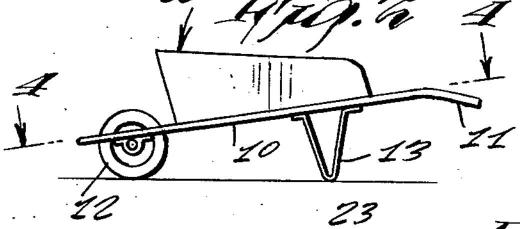
Fig. 2 is a side elevational view of the wood flat bed and frame combination.
Figure 3:
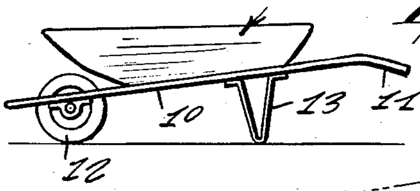
Fig. 3 is a side elevational view of the metal bed and frame combination.

Referring now more in detail to the drawing, 10 indicates a V-shaped wheelbarrow frame having the handle portions 11 and the rotatably mounted wheel 12, substantially as illustrated. The usual skids 13 are mounted on the frame 10 near the handles 11.

In the practice of my invention a pair of L-shaped brackets 14 are secured to the inside of frame 10 in laterally aligned relationship, slightly rearwardly of wheel 12, by means of the rivets, bolts 15, or welding. The inwardly extending portions of the brackets 14 fixedly carry the pins or male studs 16.

A second pair of brackets 17 are secured to the insides of the frame 10 slightly forwardly of the handles 11 by means of the rivets, bolts 18 or welding, the forward ends of the brackets 17 being integrally formed with the hollow cylindrical portions 19 aligned longitudinally with pin 16. A pair of pins 20 are provided for insertion through the hollow cylindrical portions 19, each of the pins 20 fixedly carrying a handle 21 to facilitate the insertion and removal thereof.

A separable wood flat bed indicated generally at 22 is provided and is adapted to rest on frame 10. A metal bed indicated generally at 23 is also provided for the same purpose. Each of the beds 22, and 23, fixedly mounts on the undersurface thereof a pair of diverging tubular members 24 adapted to be aligned with the inner faces of frame 10, the tubular members 24 being mounted by the strap clamps 25 suitably secured to the undersurface of the beds and surrounding the tubular members, as will be obvious. The tubular members 24, brackets 14 and 17 and pins 20 are formed of iron.

Figure 4:
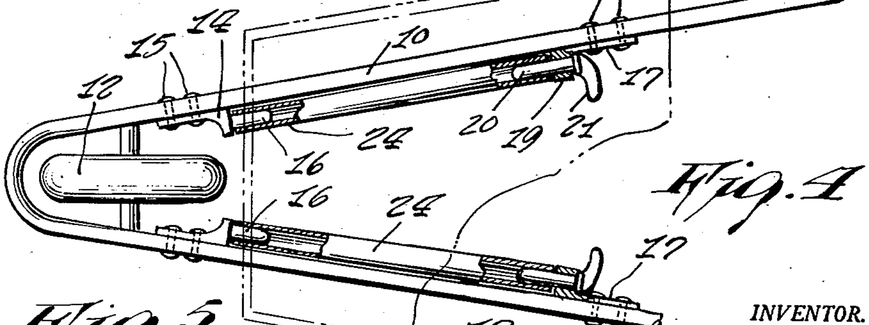
Fig. 4 is a top plan view looking along the line 4—4 of Fig. 2 and shown partly in section.
Figure 5:
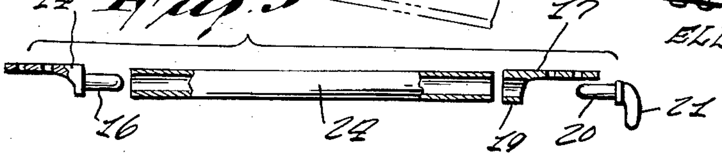
Fig. 5 is an exploded side elevational view shown partly in section of the parts comprising the invention.

In operation, the bed 22 or 23 is placed on the frame 10 with the pins 16 being received in the forward ends of the tubular members 24, the rear ends of the latter being aligned with the hollow cylindrical portions 19. The pins 20 are then inserted (Fig. 4) whereby to secure the bed on the frame. When it is desired to remove the bed, it is only necessary to remove the pins 20, raise the rear ends of the tubular members 24 clear of the hollow cylindrical portions 19 and then remove the tubular members rearwardly from pins 16.

Any type of wheelbarrow bed may be mounted on the tubular members 24, and extra beds may be easily stored. The beds may be removed from the frame and loaded onto the truck or left at any point. This would obviously effect an economy of time in loading and unloading.

While various changes may be made in the detail construction, it shall be understood that such changes shall be within the spirit and scope of the present invention as defined by the appended claim.

In a wheelbarrow, a frame, a separable bed adapted to rest on said frame, a pair of converging members secured to the undersurface of the bed and adapted to be aligned with the inner faces of said frame, a pair of substantially L-shaped brackets secured to the inside of said frame at opposite sides thereof near the forward end thereof, a pair of pins secured to the inwardly extending portions of said L-shaped brackets a second pair of brackets secured to the inside of said frame at opposite sides thereof near the rear end thereof each of said second brackets at the forward end thereof being formed of a hollow cylindrical portion adapted to be aligned with the rear ends of said converging tubular members, and a pin insertable through said cylindrical portions and into the rear ends of said tubular members, each of said pins having an inwardly extending handle to facilitate the removal and insertion thereof, the forward ends of said tubular members fitting onto said pins.

References Cited in the file of this patent

UNITED STATES PATENTS

| | | |
|---|---|---|
| 1,769,271 | Parsons | July 1, 1930 |

FOREIGN PATENTS

| | | |
|---|---|---|
| 631,325 | France | Sept. 12, 1927 |
| 1,094,709 | France | Dec. 8, 1954 |
| 462,240 | Germany | Mar. 11, 1927 |
| 617,573 | Great Britain | Feb. 8, 1949 |